US008727722B2

(12) United States Patent
Houser et al.

(10) Patent No.: US 8,727,722 B2
(45) Date of Patent: May 20, 2014

(54) SYSTEM AND METHODS FOR ADAPTIVE BLADE CONTROL SURFACE ADJUSTMENT

(75) Inventors: Peter B. Houser, Poway, CA (US); John Henry Studer, Lemon Grove, CA (US); Gerald L. Vossler, Grand Rapids, MI (US); John Hafer, Winchester, CA (US)

(73) Assignee: General Electric Company, Schenectady, NY (US)

( * ) Notice: Subject to any disclaimer, the term of this patent is extended or adjusted under 35 U.S.C. 154(b) by 1729 days.

(21) Appl. No.: 11/964,934

(22) Filed: Dec. 27, 2007

(65) Prior Publication Data

US 2010/0047067 A1 Feb. 25, 2010

(51) Int. Cl.
*B64C 9/00* (2006.01)

(52) U.S. Cl.
USPC .................................. 416/1; 416/23; 416/31

(58) Field of Classification Search
USPC ........................................... 416/1, 23, 24, 31
See application file for complete search history.

(56) References Cited

U.S. PATENT DOCUMENTS

| 2,716,460 | A | * | 8/1955 | Young | 416/24 |
|---|---|---|---|---|---|
| 3,554,662 | A | * | 1/1971 | Lemont | 416/1 |
| 4,379,678 | A | | 4/1983 | Carlock et al. | |
| 4,519,743 | A | | 5/1985 | Ham | |
| 4,650,400 | A | | 3/1987 | David | |
| 4,930,988 | A | | 6/1990 | Griffith | |
| 5,678,786 | A | | 10/1997 | Osder | |
| 5,850,615 | A | | 12/1998 | Osder | |
| 6,099,254 | A | | 8/2000 | Blaas et al. | |
| 6,322,324 | B1 | * | 11/2001 | Kennedy et al. | 416/1 |
| 6,448,924 | B1 | * | 9/2002 | Hafer, Jr. | 342/28 |
| 6,530,542 | B2 | * | 3/2003 | Toulmay | 244/17.13 |
| 6,666,649 | B2 | | 12/2003 | Arnold | |
| 7,677,868 | B2 | * | 3/2010 | Chaudhry et al. | 416/23 |
| 7,762,770 | B2 | * | 7/2010 | Sun et al. | 416/23 |
| 2005/0042091 | A1 | * | 2/2005 | Torok et al. | 416/1 |
| 2008/0138203 | A1 | * | 6/2008 | Collins et al. | 416/23 |

FOREIGN PATENT DOCUMENTS

| JP | 10016896 | 1/1998 |
|---|---|---|
| JP | 2003511680 A | 3/2003 |

OTHER PUBLICATIONS

International Search Report, PCT/US2008/086440, dated Apr. 3, 2009, pp. 4.
JP Office Action dated Apr. 23, 2013 for related JP Application No. 2010-540761.

\* cited by examiner

*Primary Examiner* — Edward Look
*Assistant Examiner* — Aaron R Eastman
(74) *Attorney, Agent, or Firm* — Matthew P. Hayden, Esq.; Armstrong Teasdale LLP

(57) ABSTRACT

A system and methods for reducing vibration in a rotatable member are provided. The system includes a blade tracking sensor, a rotatable member comprising an adjustable aspect, and a control computer. The control computer is configured to determine an axial position of each blade, determine a first blade that is displaced by a greatest distance along the axis in a first direction, modify an aspect of the first blade to facilitate reducing a vibration in the rotary blade system, determine if the vibration level in the rotary blade system is reduced, and select another rotatable member to modify such that a vibration in the rotary blade system is facilitated being further reduced.

20 Claims, 3 Drawing Sheets

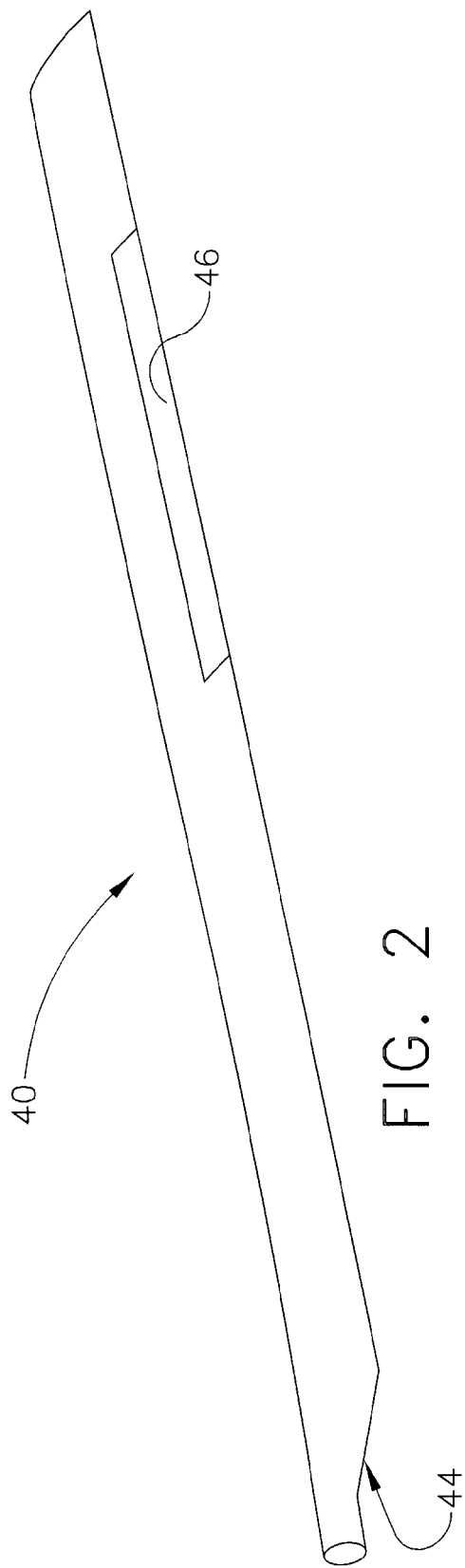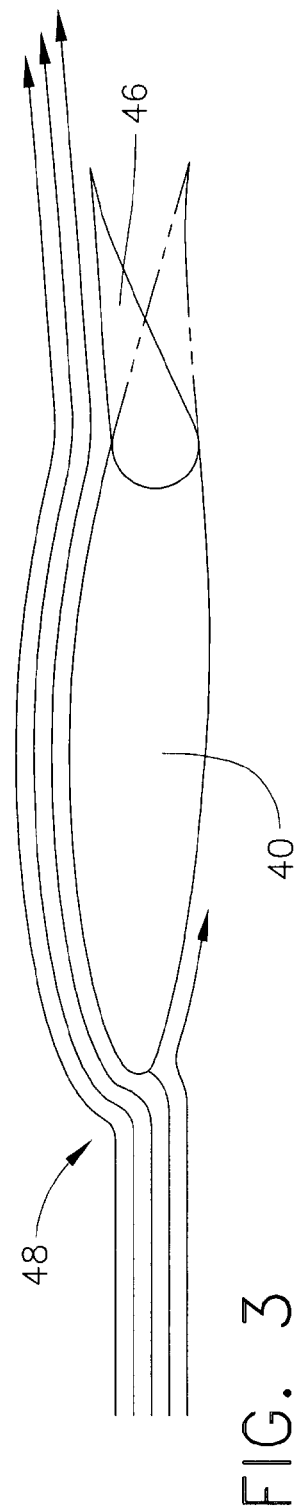

SYSTEM AND METHODS FOR ADAPTIVE BLADE CONTROL SURFACE ADJUSTMENT

BACKGROUND OF THE INVENTION

The field of the invention relates generally to rotary fan blades and more specifically to a control system for use in adjusting a relative position of a rotary fan blade.

A helicopter is a rotary-wing aircraft that uses a system of power-driven rotor blades to generate lift and thrust that enables the helicopter to climb/descend and to move in a horizontal direction. A pitch of each blade may be individually adjustable to vary the angle of attack and an amount of lift generated by each blade. In some known helicopters, a pilot is provided with a collective pitch control, which changes the pitch on all of the blades simultaneously and equally, and a cyclic pitch control, which constantly varies the pitch of the individual blades through each cycle of rotation. Moreover, varying the pitch of the rotating blades with the cyclic pitch control facilitates control of the pitch and roll.

During forward flight, an asymmetry in lift exists between the advancing-side rotor blades and the retreating-side rotor blades. However, this asymmetry induces a rolling moment to the helicopter when such rotors are rigidly connected. In some other known helicopters, flap hinges or a gimbaled mechanism are used at the root of the rotor blades to substantially eliminate the rolling moment experienced during flight. Additionally, the asymmetry in lift causes the blades to flap which substantially equalizes the lift on the advancing and retreating sides. However, blade flapping also limits the rotor's efficiency in forward flight, and may induce unwanted vibration into the rotor assembly.

In known helicopter rotor blade systems, a rotating blade creates a circular path that is commonly referred to in the art as a rotor plane. Under normal operating conditions, each blade may travel in a sinusoidal path within the rotor plane and be offset with respect to the other blades. However, such rotor blade paths may induce vibrations similar to those induced by an imbalance to the rotor blade system. To facilitate controlling vibration, at least some known helicopters use rotor adjustments as pitch and vibration dampers. Other known helicopters use mechanical feedback systems to sense and counter vibration. Known feedback systems use a mass as a stable reference, and a linkage extending from the mass operates a flap to adjust the rotor blade's angle of attack to counter the vibration. However, locating the origin of the vibration may be difficult. Some known countering systems use a stroboscopic flash lamp to observe painted markings or colored reflectors on the underside of the rotor blades. Adjustments to the rotor pitch may then be made to the identified rotor blades to facilitate controlling vibration.

BRIEF DESCRIPTION OF THE INVENTION

In one aspect, a method for reducing vibration in a rotary blade system is provided. The system includes at least two rotor blades rotatable about an axis and also includes an adjustable aspect. The method includes determining an axial position of each blade, determining a first blade that is displaced by a greatest distance along the axis in a first direction, and modifying an aspect of the first blade to facilitate reducing vibration in the rotary blade system.

In another aspect, a method for reducing vibration in at least one helicopter rotor blade is provided. The blade is rotatable about an axis and includes an adjustable aspect. The method includes determining an axial position of each blade, determining a first blade that is displaced by a greatest distance along the axis in a first direction, determining a second blade that is displaced by a greatest distance along the axis in a second direction, and actuating a control surface upon said selected first and second blades such that the displaced distance is facilitated being reduced.

In another aspect, a system for reducing vibration in a rotatable member is provided. The system includes a blade tracking sensor, a rotatable member comprising an adjustable aspect, and a control computer. The control computer is configured to determine an axial position of each blade, determine a first blade that is displaced by a greatest distance along the axis in a first direction, modify an aspect of the first blade to facilitate reducing a vibration in the rotary blade system, determine if the vibration level in the rotary blade system is reduced, and select another rotatable member to modify such that a vibration in the rotary blade system is facilitated being further reduced.

BRIEF DESCRIPTION OF THE DRAWINGS

FIG. 2 is a perspective view of an exemplary rotor blade used with the helicopter shown in FIG. 1;

FIG. 3 is a cross-sectional view of the rotor blade shown in FIG. 2 and including a control surface deflected upwardly.

DETAILED DESCRIPTION OF THE INVENTION

Figure 1:
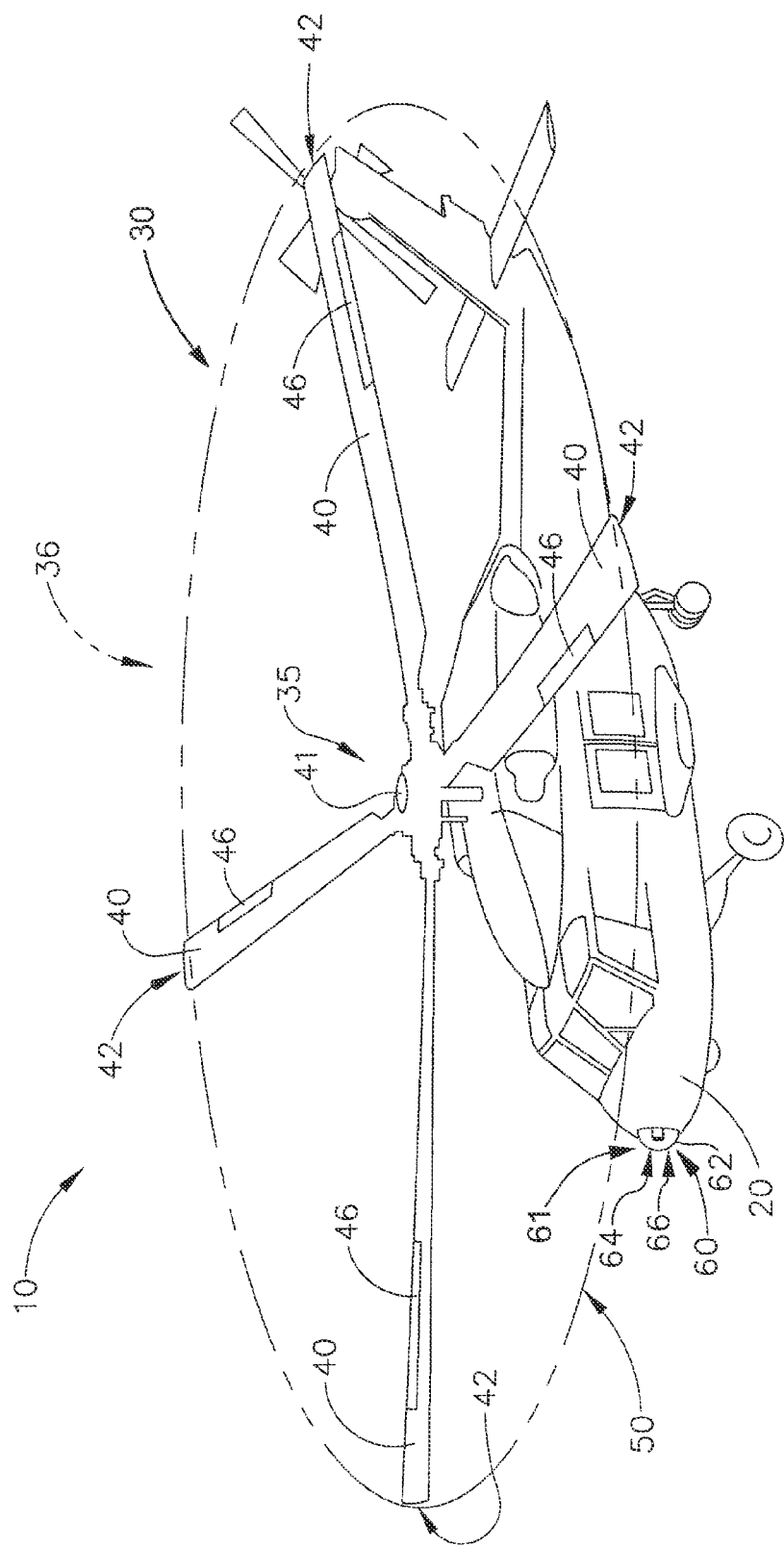
FIG. 1 is perspective view of an exemplary helicopter including a vibration reduction system mounted thereon.

FIG. 1 illustrates a perspective view of an exemplary helicopter 10, including a fuselage 20 and a rotary blade system 30 that includes a rotor 35 and a plurality of rotor blades 40 that each extends from a central hub 41 outward to a rotor tip 42. During rotation of rotor 35, rotor blades 40 define a tip path or rotor plane 50. In the exemplary embodiment, a blade tracking system 60 that includes a sensor housing 61 containing a blade tracking sensor 62 and a control computer 64 is mounted to fuselage 20. Alternatively, control computer 64 may be positioned relative to helicopter 10 at any location that enables blade tracking sensor 62 to function as described herein.

The blade tracking sensor 62 senses a position of each rotor blade 40, and in the exemplary embodiment, includes a substantially planar plate antenna 66 that is coupled to transmission and receiving circuitry (not shown). In the exemplary embodiment, antenna 66 continuously transmits an RF signal in the direction of rotor plane 50. Changes in impedance of antenna 66, caused by a rotor blade passing in the proximity of antenna 66, for example, are detected by detection circuitry (not shown). Furthermore and in the exemplary embodiment, in response to the sensed impedance changes, the detector circuitry generates output signals indicative of a position of each blade 40 relative to the other blades 40 while helicopter 10 is in flight. In another embodiment, a tachometer (not shown) may be coupled to rotary blade system 30.

FIG. 2 illustrates a perspective view of rotor blade 40. FIG. 3 is a cross-sectional view of blade 40. In the exemplary embodiment, each rotor blade 40 extends between tip 42 and a root 44 and includes a movable control surface 46 that enables an adjustable aspect of blade 40 to be selectively modified to facilitate reducing vibration levels produced in rotor 35 (shown in FIG. 1). As used herein, the term "adjustable aspect" refers to, but is not limited to only referring to, at least any one or more of the following: lift, drag and bending moment, or any other force or moment that acts upon blade 40 and that may be modified to facilitate reducing a vibration produced by rotor 35. In the exemplary embodiment, control surface 46 is an externally-controllable trim tab. Alternatively, control surface 46 may be any control that enables the height of the blade 40 to be adjusted and for vibration reduction system function as described herein.

Deflection of exemplary control surface 46 will cause a corresponding deflection of air 48 flowing over blade 40. Control surface 46 is coupled to blade 40 on hinges (not shown) so that each control surface 46 may rotate with respect to hinges (not shown) and thus deflect air 48 passing over blade 40. This redirection of air 48 changes the lift generated by blade 40. As illustrated in FIG. 3, deflecting control surface 46 upwardly causes blade 40 to generate less lift and track in a downward direction. Similarly, deflecting control surface 46 downwardly causes blade 40 generate more lift and track in an upward direction.

In operation, signals from the blade tracking sensor 62 are analyzed by the control computer 64 to determine which blade 40 is the farthest distance and which blade is the closest distance from the blade tracking sensor 62. Control computer 64 effects a small change to control surface 46 on one or more blades 40 and analyzes the ensuing blade tracking sensor 62 signals to determine whether overall relative tracking has been modified in a desirable manner. If an improvement was sensed, then small changes would then be repeated until further changes either ceased to improve, or began to degrade the relative tracking. Alternatively, the signals from tachometer (not shown) are used to positively correlate the blade tracking sensor 62 signals with specific blades 40 in the rotary blade system. Control computer 64 may then facilitate a small change to an arbitrary blade 40 and then analyze the resulting signals from the blade tracking sensor 62 to determine whether overall relative tracking were modified in a desirable manner.

Figure 4:
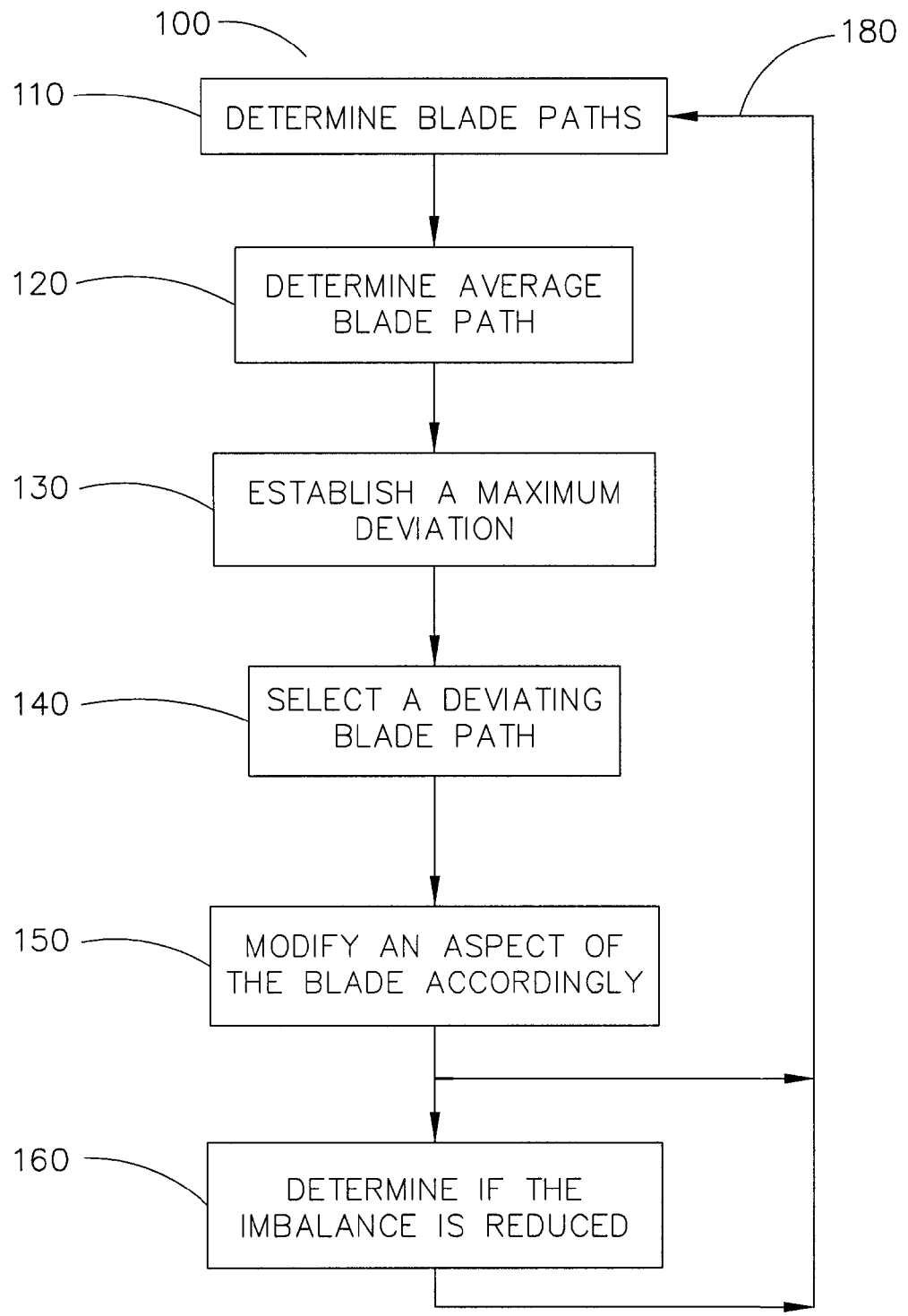
FIG. 4 is a flow chart of an exemplary method for reducing vibration levels a rotary blade system, such as the system shown in FIG. 1.

FIG. 4 is a flow chart illustrating an exemplary method 100 for reducing the vibration by a rotary blade system, such as system 30 (shown in FIGS. 1-3) by using a control computer, such as computer 64 (shown in FIG. 1) to provide substantially continuous adjustments to the blade control surfaces, such as control surface 46 (shown in FIG. 3). Method 100 includes determining an axial position for each blade in the system 110. In the exemplary embodiment, a blade tracking system, such as blade tracking system 60 (shown in FIG. 1) includes a sensor housing containing a blade tracking sensor, a control computer, and an antenna, and is mounted to a helicopter fuselage, such as fuselage 20 (shown in FIG. 1). Blade tracking sensor, such as sensor 62 (shown in FIG. 1), includes an antenna, such as antenna 66 (shown in FIG. 1). Sensor 62 is coupled in communication with the control computer, such as control computer 64 (shown in FIG. 1) within the rotor blade system. The sensor, in the exemplary embodiment, transmits a signal beam in the direction of a rotor plane defined during rotation of the blades. An impedance of the antenna changes as each blade rotates into the signal beam. An amount by which the impedance changes varies depending on the physical location of the sensor and the distance from the sensor to the blade entering the signal beam. The varying impedance caused by a blade passing the antenna will modulate the transmitted signal and provide an indication of the relative location of each blade as each blade passes in the proximity of the sensor.

In the exemplary embodiment, a blade path is determined 110 using a microwave blade tracking device. In another embodiment, an optical blade tracking device may be used to determine 110 the blade path. Alternatively, any sensing device may be used that enables the blade tracking system to function as described herein. In the exemplary embodiment, a single beam blade tracking device is used to determine the blade path based upon sensed changes in antenna impedance. Alternatively, a multi-beam tracking device may be used to determine the blade path based upon sensed changes in antenna impedance.

After each blade path is determined 110, a first blade deviation is determined 120. In the exemplary embodiment, control computer, such as computer 64 (shown in FIG. 1) determines 120 the blade whose distance lies the farthest distance from the blade tracking sensor, such as blade tracking sensor 62 (shown in FIG. 1). In the exemplary embodiment, the determined 120 distance lies along an axis defined perpendicular to the rotational plane of the blades in the rotary blade system. Alternatively, the determined distance is the distance from the blade tracking sensor to a common point on the blades being measured. Upon determining 120 the first blade deviation, a second blade deviation is determined 130. In the exemplary embodiment, control computer, such as computer 64 (shown in FIG. 1) determines 130 the blade whose distance lies the closest distance from the blade tracking sensor, such as blade tracking sensor 62 (shown in FIG. 1). In the exemplary embodiment, the determined 130 distance lies along an axis defined perpendicular to the rotational plane of the blades in the rotary blade system. Alternatively, the determined 130 distance is the distance from the blade tracking sensor to a common point on the blades being measured.

After the farthest 120 and closest 130 blades are determined, an adjustable aspect of each blade is modified 150, shifting the blade path of the selected blades to facilitate reducing vibration in the rotary blade system. For example, in the exemplary embodiment, the angle of attack of the rotor blade relative to the oncoming air stream is modified by a control surface of the blade. Moreover, and in the exemplary embodiment, a trim tab is used to modify the shape of the blade airfoil and change the blade's angle of attack relative to the oncoming air stream. Alternatively, any control may be used to modify the lift, drag and/or bending moment of the blade, or any other force or moment that acts upon blade and that continues to enable the rotary blade system to function as described herein.

Following modification 140 of an aerodynamic aspect of the blade, the control computer will then determine 150 whether the blade path was modified 140 as desired and the vibration levels reduced by analyzing the resulting blade data for each blade received from the tracking sensor. In the exemplary embodiment, if an improvement in the vibration level is sensed, additional modifications 140 are executed to facilitate shifting the blade path into the allowable range. Alternatively, the control computer may cease modifications to the selected blade path and new, axial blade positions may be determined 110. In the exemplary method, another blade will then be selected 160 and the process repeated.

In the alternative method, the control computer may, at any point after modifying 140 the aspect of the chosen blade, loop back 170 to the step of determining 110 the individual blade paths and recommence the process 100 to facilitate further reducing vibration levels in the rotor.

Exemplary embodiments for reducing vibration levels in rotary blade systems are described in detail above. The exemplary methods described herein may be continuously executed to enable real-time adjustments to blades to facilitate reducing vibration levels produced by the rotary assembly. The above-described vibration reduction system and methods include using a blade tracking sensor to determine the blades in a rotary blade system whose blade paths lie closest to and farthest from the blade tracking sensor and to facilitate reducing vibrations produced by the rotary blade system by adjusting aerodynamic aspects of each blade. As such, the need for sophisticated electronics to sense and compute the magnitude of the absolute blade height relative to the other blades is facilitated being reduced. Additionally, the system and methods described herein provide an overall more effective and less sophisticated sensor than those systems that require determining precise relative blade heights.

Although the system and methods described herein are described in the context of sensors used to facilitate reducing vibration levels produced by a rotary blade system, it is understood that the system and methods are not limited to the balancing of rotor blades. Likewise, the system components illustrated are not limited to the specific embodiments described herein, but rather, system components can be utilized independently and separately from other components described herein.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

While the invention has been described in terms of various specific embodiments, those skilled in the art will recognize that the invention can be practiced with modification within the spirit and scope of the claims.

What is claimed is:

1. A method for reducing vibration in a rotary blade system including at least two rotor blades rotatable about an axis, wherein the at least two blades include an adjustable aspect, said method comprising:
    determining an axial position of each blade relative to a blade tracking sensor;
    selecting a first blade of the at least two rotor blades to modify based on which of the at least two rotor blades is displaced by a greatest distance from the blade tracking sensor along the axis in a first direction; and
    modifying an aspect of the first blade to change an axial position of the first blade only until the first blade is not the blade that is the greatest distance from the blade tracking sensor in the first direction to facilitate reducing vibration in the rotary blade system.

2. A method in accordance with claim 1, further comprising:
    determining if the vibration in the rotary blade system is reduced; and
    selecting another blade to modify such that a vibration in the rotary blade system is facilitated being further reduced.

3. A method in accordance with claim 1, further comprising determining a second blade that is displaced by a greatest distance along the axis in a second direction.

4. A method in accordance with claim 3, further comprising modifying the adjustable aspect of the first and second blades using at least one trim tab provided on at least one of the first and second blades.

5. A method in accordance with claim 4, wherein modifying the adjustable aspect of the first and second blades further comprises modifying at least one of an angle of attack of each blade and an airfoil shape, such that a change is realized in at least one of lift, drag, and bending-moment coefficients.

6. A method in accordance with claim 1, wherein determining an axial position of each blade further comprises determining a position using at least one of a single beam blade tracker and a dual beam blade tracker.

7. A method in accordance with claim 1, wherein determining an axial position of each blade further comprises determining a position using at least one of a microwave blade tracker and an optical blade tracker.

8. A method in accordance with claim 7, wherein determining an axial position of each blade using a microwave blade tracker further comprises determining the axial position using changes in antenna impedance.

9. A system for reducing vibration in a rotatable member, said system comprising:
    a blade tracking sensor;
    at least two rotatable members that each comprise an adjustable aspect;
    a control computer configured to:
        determine an axial position of each rotatable member relative to the blade tracking sensor;
        select a first rotatable member of the at least two rotatable members to modify based on which of the at least two rotor blades is displaced by a greatest distance from the blade tracking sensor along the axis in a first direction;
        modify an aspect of the first rotatable member to change an axial position of the first rotatable member only until the first rotatable member is not the rotatable member that is the greatest distance from the blade tracking sensor in the first direction to facilitate reducing a vibration in the rotary blade system;
        determine if the vibration level in the rotary blade system is reduced; and
        select another rotatable member to modify such that a vibration in the rotary blade system is facilitated being further reduced.

10. A system in accordance with claim 9, wherein the blade tracking sensor is at least one of a single beam blade tracker and a dual beam blade tracker.

11. A system in accordance with claim 10, wherein the blade tracking sensor comprises at least one of a microwave blade tracker and an optical blade tracker.

12. A system in accordance with claim 11, wherein the blade tracking sensor is configured to determine the axial position using changes in antenna impedance.

13. A system in accordance with claim 9, wherein the rotatable member further comprises a helicopter rotor blade.

14. A system in accordance with claim 9, wherein the rotatable member further comprises at least one trim tab configured to facilitate modifying the aspect of the blade.

15. A system in accordance with claim 9, wherein the control computer is further configured to determine a second rotatable member that is displaced by a greatest distance along the axis in a second direction.

16. A method for reducing vibration in at least two helicopter rotor blades, the blade at least two helicopter rotor blades are rotatable about an axis and include an adjustable aspect, the method comprising:
    determining an axial position of each blade relative to a blade tracking sensor;
    selecting a first blade of the at least two helicopter rotor blades to modify based on which of the at least two helicopter rotor blades is displaced by a greatest distance from the blade tracking sensor along the axis in a first direction;
    selecting a second blade of the at least two helicopter rotor blades to modify based on which of the at least two helicopter rotor blades is displaced by a greatest distance from the blade tracking sensor along the axis in a second direction; and actuating a control surface upon said selected first and second blades such that the displaced distance is facilitated being reduced, to change an axial position of the first blade only until the first blade is not the blade that is the greatest distance from the blade tracking sensor in the first direction, and to change an axial position of the second blade only until the second blade is not the blade that is the greatest distance from the blade tracking sensor along the axis in the second direction.

17. A method in accordance with claim 16, further comprising selecting another blade to modify such that a vibration in the rotary blade system is facilitated being further reduced.

18. A method in accordance with claim 16, wherein actuating a control surface further comprises actuating at least one trim tab provided on the blade.

19. A method in accordance with claim 16, further comprising modifying the adjustable aspect of the first and second blades using at least one trim tab provided on each blade.

20. A method in accordance with claim 16, wherein actuating a control surface further comprises actuating a control surface such that a change is realized in at least one of lift, drag, and bending-moment coefficients.

* * * * *